OR 4,062,625

United States Patent [19]
Fleischman et al.

[11] 4,062,625
[45] Dec. 13, 1977

[54] REFLEX COPIER LENS

[75] Inventors: Andor A. Fleischman, Northbrook; Walter R. Linke, Chicago, both of Ill.

[73] Assignee: Bell & Howell Company, Chicago, Ill.

[21] Appl. No.: 720,282

[22] Filed: Sept. 3, 1976

[51] Int. Cl.$^2$ .......................... G02B 17/06; G02B 3/04
[52] U.S. Cl. ........................ 350/202; 350/175 NG; 350/189
[58] Field of Search .................. 350/175 NG, 189, 202

[56] References Cited
U.S. PATENT DOCUMENTS 3,659,922   5/1972   McCrobie .......................... 350/202

FOREIGN PATENT DOCUMENTS 2,500,070   10/1975   Germany .......................... 350/202
1,008,952   11/1965   United Kingdom .................. 350/202

Primary Examiner—Paul A. Sacher
Attorney, Agent, or Firm—John E. Peele, Jr.; Roger M. Fitz-Gerald

[57] ABSTRACT

A lens system primarily for a copier is a plastic and glass lens design of reflex configuration enabling lower manufacturing cost with a higher degree of optical correction than a comparable all glass straight through design of similar optical characteristics. In the preferred embodiment, the plastic element is formed with aspheric surfaces.

1 Claim, 10 Drawing Figures

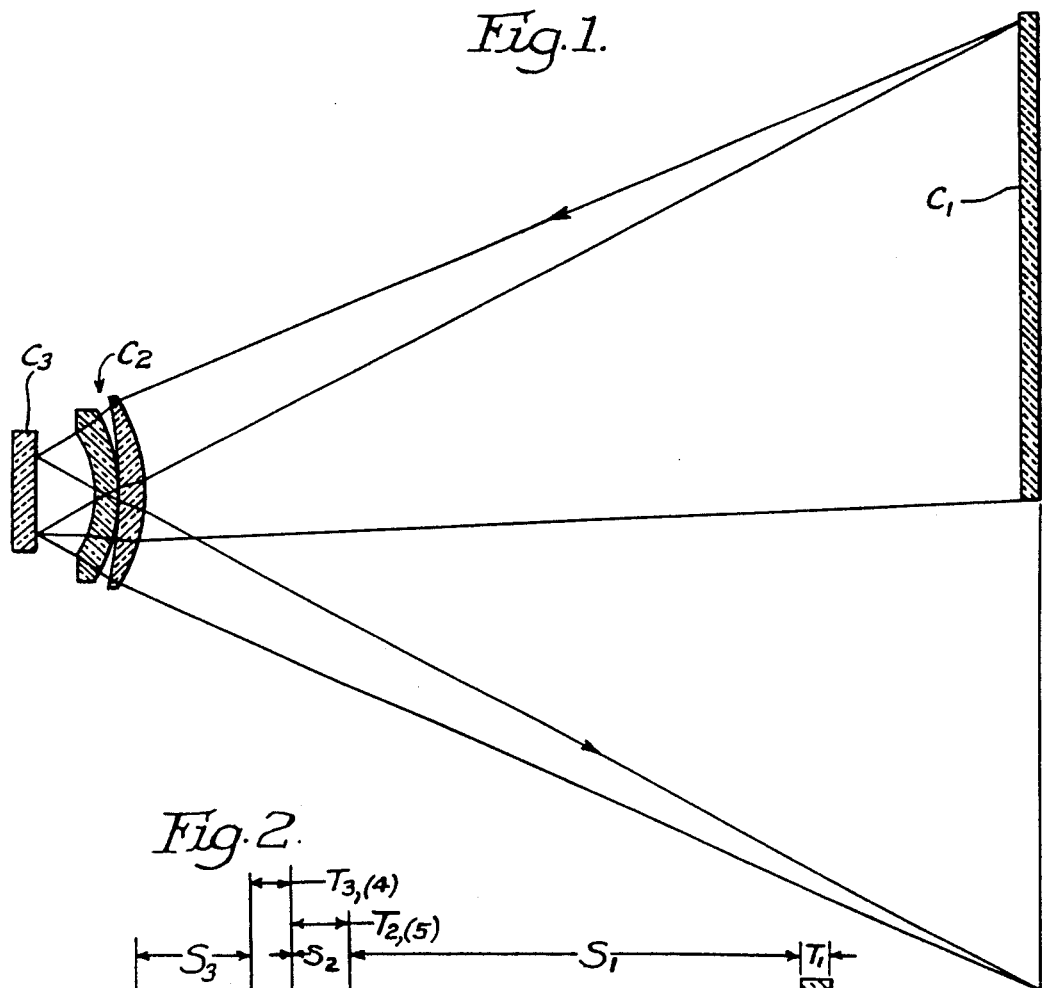
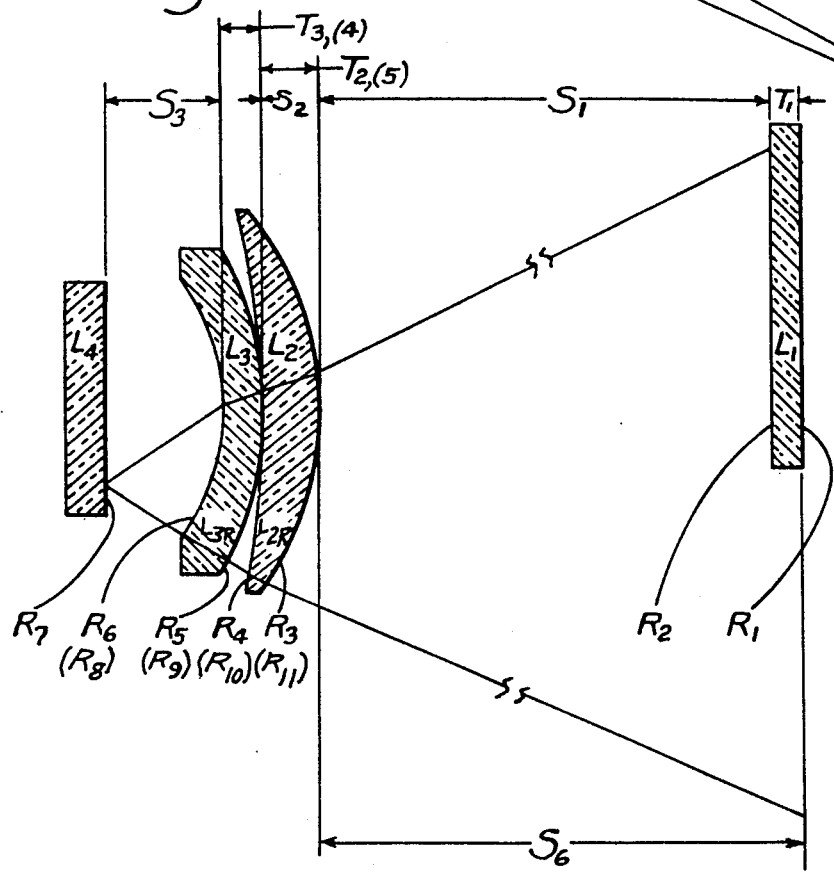

REFLEX COPIER LENS

This invention relates to a lens system for a copier in which original material is optically copied, essentially at a one-to-one ratio, onto sensitized copy material, such as electrostatically-treated paper. More particularly, the lens system relates to a glass and plastic lens design in reflex configuration by which the image of the original passes through some elements of the lens and is reflected by a rearward mirrored surface to again pass through these elements to the copy material. This lens design with selected elements having aspheric surfaces, permits a high optical correction with a lower manufacturing cost than a comparable optical system of similar design parameters.

Document copiers capable of one-to-one reproduction have become more popular and the field more competitive with the increased popularity. To remain competitive, lower cost components are desirable while maintaining or improving performance to image the documents on the copy material. To reach these goals in the past, complex lens systems having as many as 6 or 8 spherical glass elements have been used. Since grinding and polishing of glass is inherently expensive, the large number of elements cause the resulting lens system to be relatively expensive.

To reduce the cost of the lens system, a lens design is proposed having fewer elements than would normally be expected to be required to obtain the necessary degree of optical correction. By selecting a reflex lens system so that light rays are twice passed through certain of the lens elements, the number of elements in the system is reduced, and the physical dimensions of the copier may be altered if not reduced. Further, by molding selected of the elements of plastic, better correction of optical aberrations can be obtained with fewer elements than would be required for glass spherical lens designs of similar design parameters. Hence, a lower cost, high performance copier lens system has been designed.

An object of the invention is to provide a relatively low cost, high performance and compact copier lens of plastic and glass design in a reflex configuration.

The above and other objects of the invention will become apparent by reference to the detailed description, when taken in conjunction with the accompanying drawings.

In the drawings:

FIG. 1 is a diagrammatic view of a preferred form of the optical system, approximating positioning of the elements;

FIG. 2 is a similar diagrammatic view with the optical elements enlarged for clarity.

Figure 3A:
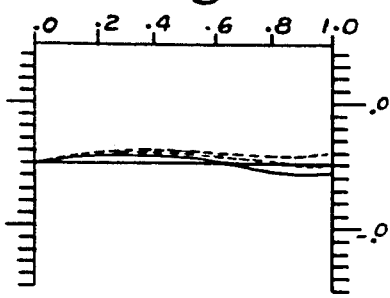
FIGS. 3a to 3h are graphical representations of the various aberrations of the lens system shown in FIG. 2, and having the design data given in the table, hereinafter.

With reference to FIG. 1 of the drawings, the preferred form of a copier lens system is shown. The document or original material to be copied is positioned, as shown, to the right of a cover plate, component $C_1$. The light rays from the illuminated original material form an image to be passed through a component $C_2$, which is the copier objective. After the light rays pass from right to left through and exit elements of the component $C_2$, the rays engage a reflective surface of a reflector component $C_3$ and are reflected back through the elements of the component $C_2$. The light rays form the image of the original on an image plane essentially parallel with the plane in which the original is located.

As shown in FIG. 2 of the drawings, the preferred embodiment of a copier lens system has a cover plate $L_1$, and two active elements $L_2$, and $L_3$. The cover plate is planar and of optical material, such as glass, proximate the exterior surface of which an original document is located to be copied. Light rays from the illuminated document form the image of the document and pass to and through component $C_2$ which is a doublet formed of elements $L_2$ and $L_3$. Thereafter, the light rays engage the component $C_3$, which is a planar front surface mirror element $L_4$. The light rays are reflected by the mirror surface of the mirror element to reflect the image back through component $C_2$ toward a not shown sensitive material at the image plane.

Element $L_2$ is a glass positive meniscus type lens element, with both surfaces of spherical section. This lens functions to form the image of the document.

The second element $L_3$ of the doublet component $C_2$ is molded of a plastic material, such as a polymethylmethacrylate. Since the element is molded, it can be more readily configured with aspheric surfaces than a similar glass element. The aspheric surfaces of the element correct optical aberrations, such as coma, to a greater degree than can a spherical element. Also, the plastic element enables the lens system to be lighter in weight than an all glass system having comparable optical characteristics. Therefore, the lens system is lighter in weight and of lower manufacturing cost than a comparable spherical glass design in which other elements would likely be required to obtain comparable correction. Since the plastic element of relatively soft material, compared to glass, is internal of the lens system, the normal concerns of potential damage due to surface scratches or the like are avoided.

The mirror element $L_4$ is reflective on the front or original near side $R_7$ thereof and reflects the light rays exiting component $C_2$ back toward and through that component therefore causing the component to provide twice the optical corrections normally expected of a comparable number of elements. Since the light rays pass reversely through the elements, selected optical distortions are canceled or at least reduced, due to symmetry about the stop.

The optical values of the optical system of FIG. 2 are as follows:

EFL = 7.5436 inches (191.61mm)
Half Angle of Field = 25.34 degrees
Aperture = f/5.03
(All dimensions in Inches)

| Lens | Radii | Thickness | Spacing | $N_D$ | V |
|---|---|---|---|---|---|
| $L_1$ | $R_1$ = INF. | $T_1$ = .2350 | | 1.522 | 59.5 |
| | $R_2$ = INF. | | $S_1$ = .0100 | | |
| $L_2$ | $R_3$ = +2.3490 | $T_2$ = .4046 | | 1.522 | 59.5 |
| | $R_4$ = −6.3260 | | $S_2$ = .0100 | | |
| $L_3$ | *$R_5$ = +2.52189 | $T_3$ = .3197 | | 1.592 | 30.4 |
| | *$R_6$ = −1.72278 | | $S_3$ = .8906 | | |
| $L_4$ | $R_7$ = −55.9411 | | MIRROR STOP | | |
| | | | $S_4$ = .8966 | | |
| $L_{3R}$ | *$R_8$ = −1.72278 | $T_4$ = .3197 | | 1.592 | 30.4 |
| | *$R_9$ = +2.52189 | | | | |
| | | | $S_5$ = .0100 | | |
| $L_{2R}$ | $R_{10}$ = −6.3260 | $T_5$ = .4046 | | 1.522 | 59.5 |
| | $R_{11}$ = +2.3490 | | | | |
| | | | $S_6$ = 13.3206 BFL | | |

In the above table, the first column lists the lens elements numerically starting at the ray entrance side of the system. The subscript "R" is added to indicate the retrace elements in which the light rays pass a second time. The second column lists the respective radii and the vertex radii of the aspheric surfaces *$R_5$, *$R_6$, *$R_7$, and *$R_8$. The positive and negative signs given the respective radii follow the "lensmaker's convention", to facilitate fabrication of the individual lens elements, wherein convex surfaces are positive and concave surfaces are negative. The aspheric surfaces are determined by the formula:

$$Z_1 = (K(H^2-Z_0^2)+2(AH^4+BH^6+CH^8+DH^{10}))/(2(1-KZ_0))$$

In the formula, constants are:

| ASPHERIC | *$R_5$ | *$R_6$ | *$R_7$ | *$R_9$ |
|---|---|---|---|---|
| RADIUS | 2.52189 | −1.72276 | 1.72275 | −2.52189 |
| K | 0.39653 | −0.58047 | 0.58047 | −0.39653 |
| A | −4.78657 × $10^{-3}$ | 5.36665 × $10^{-3}$ | −5.36665 × $10^{-3}$ | 4.78657 × $10^{-3}$ |
| B | 1.26702 × $10^{-3}$ | −2.54980 × $10^{-3}$ | 2.54980 × $10^{-3}$ | −1.26702 × $10^{-3}$ |
| C | −2.22722 × $10^{-4}$ | 5.54100 × $10^{-4}$ | −5.54100 × $10^{-4}$ | 2.22722 × $10^{-4}$ |
| D | 9.51415 × $10^{-6}$ | 3.77813 × $10^{-7}$ | −3.77813 × $10^{-7}$ | −9.51415 × $10^{-6}$ | where H is the Cartesian coordinate of a point on the surface referred in a vertical axis; and Z is the Cartesian coordinate of a point on the surface referred in a horizontal axis. The third column lists the thickness of the respective elements. The fourth column lists the axial spacings (in inches) between the respective elements, and the image plane at which the light rays are imaged. The fifth and sixth columns list respectively the refractive index $N_D$ and the dispersion index V.

FIGS. 3a to 3h graphically represent various aberrations related to the form of the optical system as shown schematically in FIG. 1 and having the design data recited in the table.

Figure 3B:
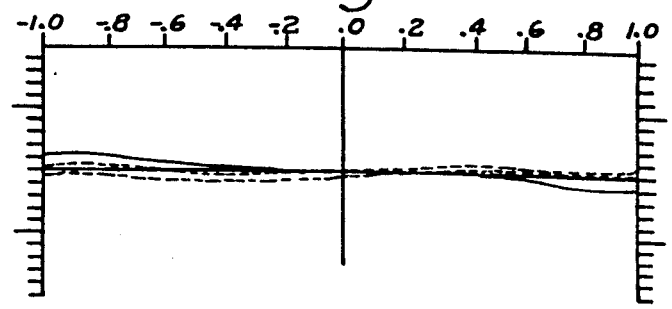
Figure 3C:
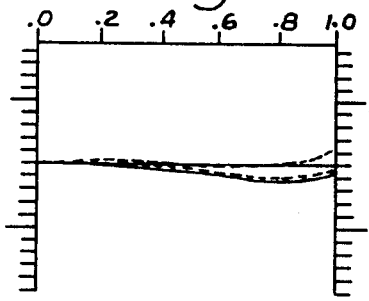
Figure 3D:
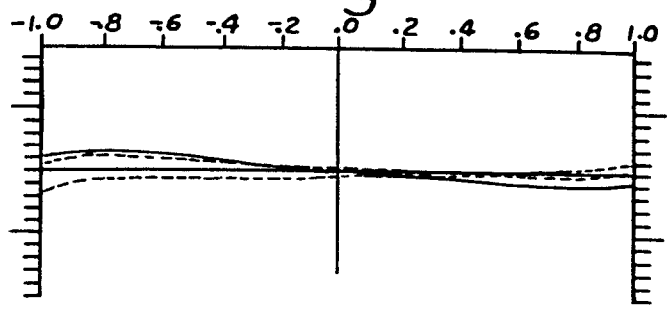
Figure 3E:
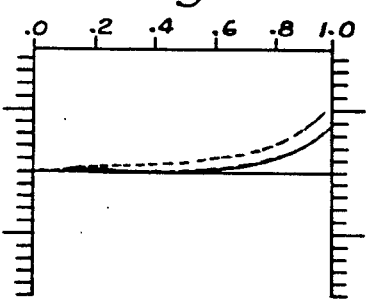
Figure 3F:
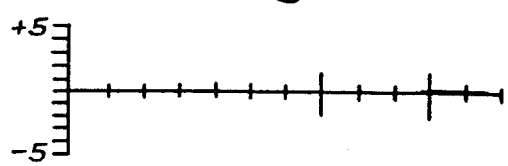
Figure 3G:
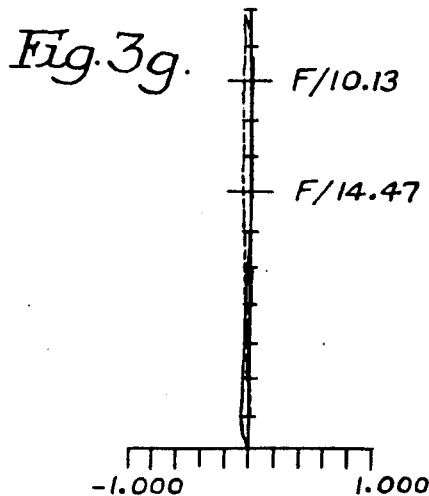
Figure 3H:
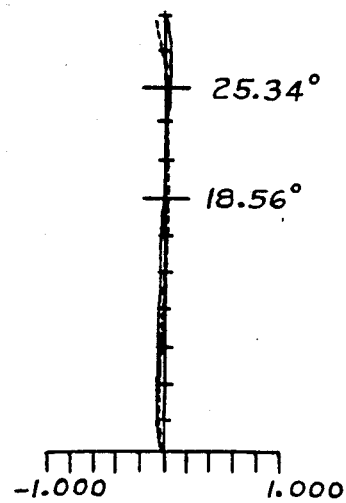

FIG. 3a represents axial chromatic correction of three typical wavelength forming rays on axis and lateral. FIG. 3b represents off axis aberrations of rays passing from the zone of the image format and through the lens transversely and tangentially. FIG. 3c represents the aberrations of the rays passing from the corner of the image format through the lens tangentially and transversely. FIG. 3d represents the radial or longitudinal aberration from the zone of the image format of rays entering the lens at 3 o'clock, while FIG. 3e represents similar aberrations from full field or corner rays. FIG. 3f represents distortion as a percentage of a "perfect" image. FIG. 3g represents the spherical aberration by a full line and the offense-against-sine-condition by the dotted line. FIG. 3h represents the curvature of field with the tangential curvature being shown in full line and the sagittal curvature being shown in dashed lines.

What I claim is:

1. An optical system of a reflex copier lens including a combination of glass and plastic elements, at least one of the elements being plastic and having aspheric surfaces, the system having substantially the following specifications:

EFL = 7.5436 inches (191.61mm)
Half Angle of Field = 25.34 degrees
Aperture = f/5.03
(All dimensions in Inches)

| Lens | Radii | Thickness | Spacing | $N_D$ | V |
|---|---|---|---|---|---|
| $L_1$ | $R_1$ = INF. | $T_1$ = .2350 | | 1.522 | 59.5 |
| | $R_2$ = INF. | | $S_1$ = .0100 | | |
| $L_2$ | $R_3$ = +2.3490 | $T_2$ = .4046 | | 1.522 | 59.5 |
| | $R_4$ = −6.3260 | | $S_2$ = .0100 | | |
| $L_3$ | *$R_5$ = +2.52189 | $T_3$ = .3197 | | 1.592 | 30.4 |
| | *$R_6$ = −1.72278 | | $S_3$ = .8906 | | |
| $L_4$ | $R_7$ = −55.9411 | MIRROR STOP | | | |
| | | | $S_4$ = .8966 | | |
| $L_{3R}$ | *$R_8$ = −1.72278 | $T_4$ = .3197 | | 1.592 | 30.4 |
| | *$R_9$ = +2.52189 | | | | |
| | | | $S_5$ = .0100 | | |
| $L_{2R}$ | $R_{10}$ = −6.3260 | $T_5$ = .4046 | | 1.522 | 59.5 |
| | $R_{11}$ = +2.3490 | | | | |
| | | | $S_6$ = 13.3206 BFL | | | wherein the first column lists the lens elements numerically, the second column lists the respective radii and vertex radii of the aspheric surfaces *$R_5$, *$R_6$, *$R_7$, and *$R_8$ of the elements, using the convention that convex surfaces have positive radii and concave surfaces have negative radii, the third column lists the respective thickness of the elements, the fourth column lists the axial spacings between adjacent elements and the film plane, and the fifth and sixth columns list respectively the refractive and dispersive indices of the optical materials of the lens system.

* * * * *

UNITED STATES PATENT OFFICE
CERTIFICATE OF CORRECTION

PATENT NO. : 4,062,625
DATED : December 13, 1977
INVENTOR(S) : Andor A. Fleischman and Walter R. Linke It is certified that error appears in the above-identified patent and that said Letters Patent are hereby corrected as shown below:

Column 4, line 12, change the equation "EFL=7.5436 inches (191.61mm) to --EFL=7.5437 inches(191.61mm)--.

Column 4, line 31, change the equation "$S_3$=.8906" to --$S_3$=.8966--.

Column 4, line 45, change "thickness" to --thicknesses--.

Signed and Sealed this

Seventeenth Day of July 1979

[SEAL]

Attest:

LUTRELLE F. PARKER

*Attesting Officer*   *Acting Commissioner of Patents and Trademarks*